United States Patent [19]
Tanner, Jr.

[11] Patent Number: 5,797,675
[45] Date of Patent: Aug. 25, 1998

[54] SPRING CLIP FOR NEON BULBS

[75] Inventor: Walter Keisler Tanner, Jr., Chesnee, S.C.

[73] Assignee: Fallon Luminous Products Corp., Spartanburg, S.C.

[21] Appl. No.: 601,067

[22] Filed: Feb. 12, 1996

Related U.S. Application Data

[63] Continuation-in-part of Ser. No. 389,314, Feb. 16, 1995, Pat. No. 5,541,823.

[51] Int. Cl.⁶ ............................. F21V 21/00; F16L 3/00
[52] U.S. Cl. .......................... 362/396; 362/263; 362/390; 248/50
[58] Field of Search .......................... 362/396, 263, 362/390, 216, 225, 217; 248/50, 74.2, 71, 74.3

[56] References Cited

U.S. PATENT DOCUMENTS

| | | | |
|---|---|---|---|
| 2,026,949 | 1/1936 | McMahan | 248/50 |
| 2,050,559 | 8/1936 | Budnick | 248/50 |
| 2,337,267 | 12/1943 | Owen | 173/339 |
| 2,393,226 | 1/1946 | Allison | 248/50 |
| 2,744,705 | 5/1956 | Richter | 248/50 |
| 2,850,560 | 9/1958 | Heyob et al. | 174/138 |
| 2,885,538 | 5/1959 | Mahon et al. | 240/11.4 |
| 3,011,744 | 12/1961 | Morgan, Jr. | 248/50 |
| 4,666,109 | 5/1987 | Fallon et al. | 248/50 |
| 5,072,351 | 12/1991 | Lane | 362/396 |
| 5,108,054 | 4/1992 | Degand | 248/50 |
| 5,257,762 | 11/1993 | Trame et al. | 248/50 |
| 5,464,178 | 11/1995 | Grinwald et al. | 248/50 |

Primary Examiner—Ira S. Lazarus
Assistant Examiner—Nhat-Hang H. Lam
Attorney, Agent, or Firm—Hardaway Law Firm P.A.

[57] ABSTRACT

An improved tubular bulb supporting clip is disclosed. This clip allows for multiple modes of movement between the bulb supporting portion and the stationary stem of the clip. This structure allows for proper support of the tubular bulb even if the bulb has imperfections therein or the clips are not precisely positioned.

16 Claims, 3 Drawing Sheets

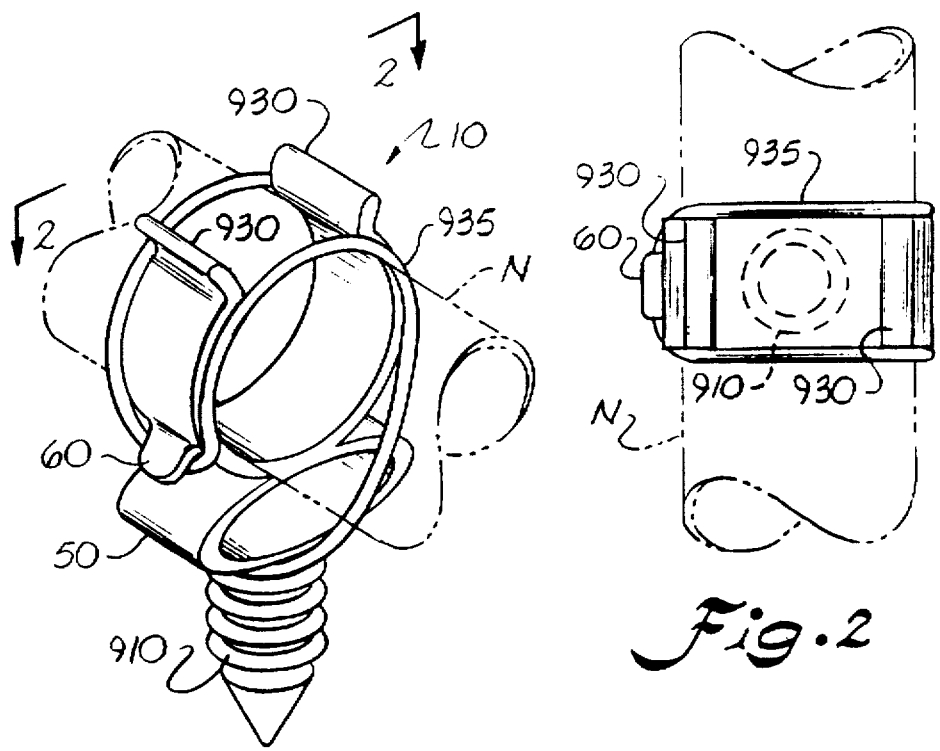
Fig. 1
Fig. 2
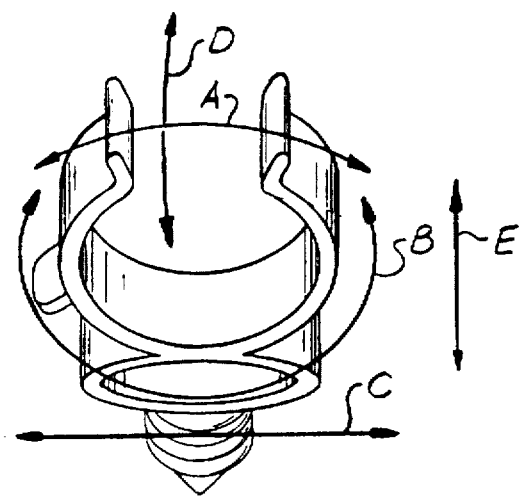
Fig. 3

5,797,675

1

SPRING CLIP FOR NEON BULBS

RELATED APPLICATIONS

This application is a continuation-in-part of allowed U.S. Ser. No. 08/389,314, filed Feb. 16, 1995, now U.S. Pat. No. 5,541,823.

BRIEF DESCRIPTION OF THE PRIOR ART

FIG. 4 is an elevational view of prior art tubular bulb clip 900. Clip 900 comprises base 910 for mounting clip 900 in some type of platform 915 such as a signboard. Base 910 has protruding members of decreasing diameter as one approaches the bottom of clip 900. This structure allows for easy locking of clip 900 within holes 917 in platform 915 but results in it being difficult for clips 900 to be removed from holes 917 of platform 915. Mounted on top of base 910 is an inverted horse-shoe-shaped support 920 for supporting bulb N. Bulb N is typically a circular and tubular neon bulb, but may also be some other type of bulb, e.g., florescent. The legs of support 920 have diverging dog-ears 930. Diverging dog-ears 930 are used to allow tubular bulb N, as it is being inserted in support 920, to push apart the upwardly directed legs of support 920. Finally, rubber band 935 is wrapped around dog-ears 930 to maintain the two legs of the inverted horse-shoe-shaped support 920 close together so as to not allow bulb N to slip out between the gap in the area of diverging dog-ears 930.

While this clip has been acceptable for its intended use, as described below, we have found important defects with its design and, therefore, there is substantial room for improvement within the art.

OBJECTS OF THE INVENTION

It is an object of the invention to provide an improved tubular bulb clip.

It is a further object of the invention an improved tubular bulb clip that allows for proper bulb placement even if the clips are not exactly and properly positioned.

It is yet a further object of the invention to provide an improved tubular bulb clip that allows for proper support of the bulb even if there are imperfections in the bulb.

It is yet a further object of the invention to provide an improved tubular bulb clip that allows for proper bulb placement and for proper support of the bulb even if the clips are not exactly and properly positioned or the bulb has imperfections by allowing for the movement of the bulb supporting portion of the clip.

It is still yet a further object of the invention to provide an improved tubular bulb clip that does not allow the bulb to either rotate or translate with respect to the clip.

These and other objects of the invention are achieved by a tubular bulb clip, comprising: a stem for supporting the clip in a platform, the stem being rigidly positioned in the platform when in use; a bulb support; and a spring between the stem and the bulb support; wherein the spring allows for movement of the bulb support with respect to the stem.

BRIEF DESCRIPTION OF THE DRAWINGS

FIG. 1 is an elevation view of a clip according to the invention.

FIG. 2 is a plan view of a clip according to the invention.

FIG. 3 is an elevation view showing the various modes of movement allowed by the bulb support of the clip according to the invention.

2

Figure 4:
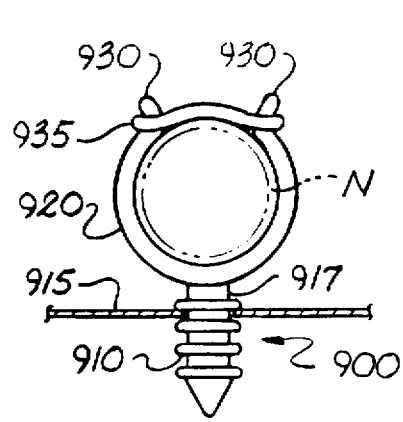

FIG. 4 is an elevation view of a prior art clip.

Figure 5A:
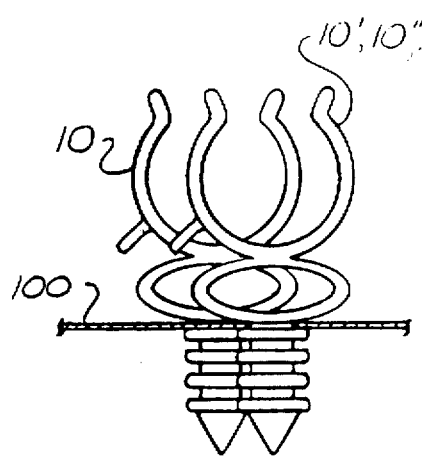
Figure 5B:
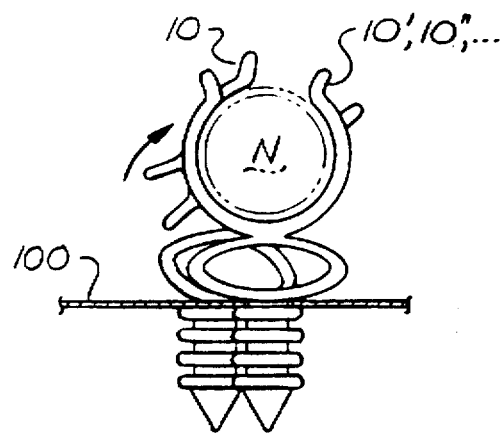

FIGS. 5A and 5B are elevation views of signs having tubular bulbs and using the improved clip according to the invention.

Figure 5C:
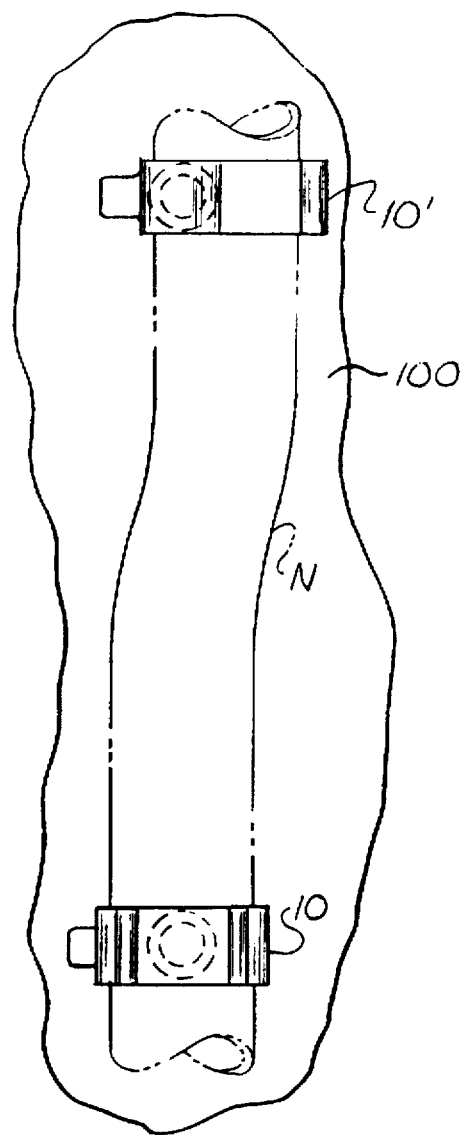

FIG. 5C is a top view of a sign having an imperfect tubular bulb and using the improved clip according to the invention.

Figure 6:
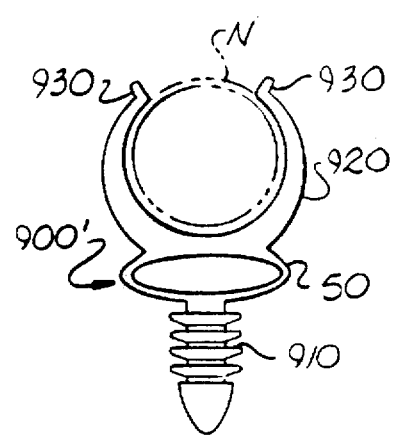

FIG. 6 is an elevation view of the clip shown in our parent application and including only the spring.

DETAILED DESCRIPTION OF THE DRAWINGS

With reference to the drawings, a detailed description of an improved tubular bulb clip that meets and achieves the various objects of the invention set forth above will now be made.

FIG. 6 shows an elevational view of improved clip 10 according to the invention and shown in this application's parent. Improved clip 10 generally comprises prior art stem 910 and inverted horse-shoe-shaped support 920 with diverging dog-ears 930. The improvement to prior art clip 900 comprises the use of spring 50 between stem 910 and support 920 and for the purposes discussed below. Spring 50 is preferably elliptical in which the major axis of the ellipse is perpendicular to stem 910. However, spring 50 may come in other shapes allowing for the various degrees of movement to be described below. Furthermore, spring 50 will usually be unitarilly formed with stem 910 and support 920 to allow improved clip 10 to be molded. Spring 50 allows for multiple modes of movement for support 920 with respect to stem 910. In particular, as shown in FIG. 3, spring 50 allows support 920 to have the following modes of movement: rocking (both left-right A and in-out D of page); partial rotation about stem 910 B; and translation (both left-right C and up-down E), with respect to stem 910. Support 920 may move in any of the previously-mentioned modes either independent of or simultaneously with the other modes to provide an almost universal joint-like structure; there is no specific sequence of movement. The polymeric material out of which clip 10 and spring 50 is made is such that this movement does not: weaken clip 10, cause other parts of clip 10 to flex or move, or place undue stress on bulb N itself.

The purpose of using spring 50 is two-fold. First, typically, tubular bulbs are rather long and therefore a series of prior art clips 900 will be needed to support the bulb on the signboard. Furthermore, the tubular bulb may have a complicated shape, such as a script letter or even a word. Therefore, the clips will have to be positioned along that complicated shape. However, because the tubular bulb is rigid and cannot flex, any clip even slightly off center or out of position with respect to the other clips results in the tubular bulb not being able to be positioned within that rigid and out of position prior art clip 900.

Second, during the production of the bulb, variations in the bulb are fairly common. Bulbs are typically hand bent (although sometimes the process is slightly automated). This results in imperfections that, although not noticeable by the eye, do cause the bulb to fall slightly out of alignment with clips prepositioned for supporting the bulb.

We have discovered that by using our improved clips 10 that allow for relative movement between support 920 and stem 910, clips 10 do not have to be as accurately positioned as with prior art rigid clips 900. As shown in FIGS. 5A and 5B, an improved clip 10 that is out of position with respect to other improved clips 10', 10", etc., as mounted to signboard 100, may have its inverted horse-shoe-shaped support 920 flexed until tubular bulb N can be placed in all the improved clips and, therefore, sturdily positioned. Furthermore, this arrangement compensates for the fact that the bulbs may have slight imperfections therein as shown in FIG. 5C. The installer merely moves support 920 of clip 10' until it is in line with the out of position and imperfect portion of bulb N. Thus, it can be seen that having support 920 move with respect to stem 910 is a substantial improvement over the prior art because it can take into account either or both types of these flaws by still allowing for the proper mounting of the bulb.

Another defect that we found in prior art clips 900 concerns their use of rubber band 935. As described above, in prior art clip 900, rubber band 935 is merely used to pull the legs of inverted horse-shoe-shaped support 920 towards each other so that tubular bulb N cannot pass through the gap in the area of diverging dog-ears 930. Such an arrangement is not entirely suitable, however. In particular, only a small arc (approximately 30°) worth of rubber band 935 is actually in contact with tubular bulb N. This means that the primary object in contact with the smooth surface of tubular bulb N is the smooth surface of prior art clip 900. We have found that this smooth-on-smooth contact results in both rotation and translation of tubular bulb N within support 920. This typically results in damage to signs containing tubular bulbs N as they are shipped or installed. We have found a way to solve this problem. In particular, this problem has been solved by having improved clip 10 have substantially more high friction rubber band 935 in contact with the smooth surface of tubular bulb N. With the instant improved clip 10, rather than 30° of rubber band\bulb surface contact, we have about 270° of rubber band 935 wrap around tubular bulb N. Considering that multiple clips are usually used in mounting a bulb, it has been found that this substantially increased high-friction wrap has virtually eliminated tubular bulb translation and rotation, and, thus, bulb damage. To achieve 270° of wrap, as shown in FIGS. 1 and 2, we use a rubber band catch 60 mounted near the bottom of one of the legs of inverted horse-shoe-shaped support 920. In operation, rubber band 935 is placed around stem 910 under spring 50, tubular bulb N is clipped into place, rubber band 935 is wrapped around while maintaining contact with bulb N (FIG. 2), and finally, rubber band 935 is hooked onto catch 60. This structure provides for dramatic reduction in bulb movement not achievable with the prior art clip structure shown in FIG. 4.

The above description is given in reference to an improved bulb clip. However, it is understood that many variations are apparent to one of ordinary skill in the art from a reading of the above specification and such variations are within the spirit and scope of the instant invention as defined by the following appended claims.

That which is claimed:

1. A tubular bulb clip, comprising:
   a stem for supporting said clip in a platform, said stem being rigidly positioned in said platform when in use;
   a bulb support; and
   a spring extending away from said stem and positioned entirely between said stem and said bulb support;
   wherein said spring allows for movement of said bulb support with respect to said stem.

2. The clip according to claim 1, wherein said spring is elliptical in shape and a major axis of said spring is perpendicular to said stem.

3. The clip according to claim 1 wherein said movement comprises rocking and rotation.

4. The clip according to claim 3 wherein said bulb support movement further comprises translation.

5. The clip according to claim 4 wherein said translation includes side-to-side and up-down translations.

6. The clip according to claim 1, wherein: said stem, said bulb support, and said spring are unitarilly formed.

7. The clip according to claim 1, further comprising:
   a bulb in said bulb support;
   a catch protruding from a lower portion of said bulb support; and
   a rubber band, said rubber band wrapped around a top of said clip stem, beneath said spring, around said bulb, and around said catch;
   whereby said rubber band is in contact with the surface of said tubular bulb along 270° of said bulb's circumference.

8. A sign made from a tubular bulb, comprising:
   a platform having holes therein,
       wherein said holes in said platform are located along a path in said platform that approximates the position of said bulb in said sign;
   a clip in each of said holes, said clips comprising:
       a stem for supporting said clip in said platform, said stem being rigidly positioned in said platform when in use;
       a bulb support; and
       a spring extending away from said stem and positioned entirely between said stem and said bulb support;
       wherein said spring allows for movement for said bulb support with respect to said stem;
   such that if any of said holes are not exactly positioned correctly or said bulb has imperfections along a major axis of said bulb, said bulb support can be moved to a position enabling said bulb support to receive said bulb.

9. The sign according to claim 8, wherein said spring is elliptical in shape and a major axis of said spring is perpendicular to said stem.

10. The sign according to claim 9, wherein said bulb support has multiple modes of movement.

11. The sign according to claim 8, wherein: said stem, said bulb support, and said spring of said clip are unitarilly formed.

12. A tubular bulb clip, comprising:
   a stem for supporting said clip in a platform, said stem being rigidly positioned in said platform when in use;
   a bulb support; and
   a spring between said stem and said bulb support;
   wherein said stem, said bulb support, and said spring are unitarilly formed;
   wherein said spring allows for movement of said bulb support with respect to said stem.

13. A tubular bulb clip comprising:
   a stem for supporting said clip in a platform, said stem being rigidly positioned in said platform when in use;
   a bulb support, said bulb support having a catch protruding from a lower portion;
   a spring between said stem and said bulb support;
   a bulb in said bulb support; and
   a rubber band, said rubber band wrapped around a top of said stem, beneath said spring, around said bulb, and around said catch, whereby said rubber band is in contact with the surface of said bulb along 270° of said bulb's circumference;
   wherein said spring allows for movement of said bulb support with respect to said stem.

14. A sign made from a tubular bulb, comprising:

a platform having holes therein, wherein said holes in said platform are located along a path in said platform that approximates the position of said bulb in said sign;

a clip in each of said holes, said clips comprising:

a stem for supporting said clip in said platform, said stem being rigidly positioned in said platform when in use;

a bulb support; and a spring between said stem and said bulb support;

wherein said spring is elliptical in shape, said spring having a major axis perpendicular to said stem;

wherein said spring allows for movement for said bulb support with respect to said stem;

such that if any of said holes are not exactly positioned correctly or said bulb has imperfections along a major axis of said bulb, said bulb support can be moved to a position enabling said bulb support to receive said bulb.

15. The sign according to claim 14, wherein said bulb support has multiple modes of movement.

16. A sign made from a tubular bulb, comprising, a platform having holes therein, wherein said holes in said platform are located along a path in said platform that approximates the position of said bulb in said sign;

a clip in each of said holes, said clips comprising:

a stem for supporting said clip in said platform, said stem being rigidly positioned in said platform when in use;

a bulb support; and a spring between said stem and said bulb support;

wherein said stem, said bulb support, and said spring of said clip are unitarilly formed; and wherein said spring allows for movement for said bulb support with respect to said stem;

such that if any of said holes are not exactly positioned correctly or said bulb has imperfections along a major axis of said bulb, said bulb support can be moved to a position enabling said bulb support to receive said bulb.

\* \* \* \* \*